United States Patent
Polewarczyk et al.

(10) Patent No.: US 10,478,916 B2
(45) Date of Patent: Nov. 19, 2019

(54) METHOD AND APPARATUS FOR JOINING COMPONENTS WITH FRICTION PINS

(71) Applicant: GM Global Technology Operations LLC, Detroit, MI (US)

(72) Inventors: Joseph M. Polewarczyk, Rochester Hills, MI (US); Hesham A. Ezzat, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 99 days.

(21) Appl. No.: 15/801,821

(22) Filed: Nov. 2, 2017

(65) Prior Publication Data

US 2019/0126384 A1    May 2, 2019

(51) Int. Cl.
*B23K 20/12* (2006.01)

(52) U.S. Cl.
CPC ........ *B23K 20/1225* (2013.01); *B23K 20/124* (2013.01); *B23K 20/127* (2013.01); *B23K 20/1235* (2013.01); *B23K 20/1255* (2013.01)

(58) Field of Classification Search
CPC .......................................... B23K 20/12–1295
USPC .............................. 228/2.1, 2.3, 112.1, 114.5
See application file for complete search history.

(56) References Cited

U.S. PATENT DOCUMENTS

| | | | | |
|---|---|---|---|---|
| 3,848,389 A * | 11/1974 | Gapp | ...................... | F16B 19/06 16/385 |
| 6,051,325 A * | 4/2000 | Talwar | ............... | B23K 20/1265 428/593 |
| 6,213,379 B1 * | 4/2001 | Takeshita | ............... | B23K 20/12 228/1.1 |
| 6,230,958 B1 * | 5/2001 | Coletta | ................. | B23K 20/129 228/112.1 |
| 6,253,987 B1 * | 7/2001 | Coletta | .................. | B23K 20/12 228/112.1 |
| 6,460,750 B1 * | 10/2002 | Coletta | ................. | B23K 20/129 228/112.1 |
| 6,640,414 B2 * | 11/2003 | Stevenson | .............. | B21J 15/027 228/112.1 |
| 6,880,743 B1 * | 4/2005 | Coletta | ................ | B23K 20/129 228/112.1 |

(Continued)

FOREIGN PATENT DOCUMENTS

| | | | | |
|---|---|---|---|---|
| DE | 102008031121 A1 * | 11/2009 | ......... | B23K 11/0046 |
| DE | 102010026667 A1 * | 3/2011 | ............ | B21J 15/027 |

(Continued)

*Primary Examiner* — Kiley S Stoner
(74) *Attorney, Agent, or Firm* — Quinn IP Law

(57) ABSTRACT

A system, apparatus, or method for joining components is provided. The system applies force along an axis, with a friction pin, to a first substrate, such as with a joiner or joining apparatus. The system also frictionally melts a portion of the first substrate adjacent the friction pin by rotating the friction pin about the axis at a first speed within the first substrate. The system also applies force to the second substrate along the axis and frictionally melts a portion of the second substrate adjacent the friction pin by rotating the friction pin at a second speed within the second substrate. The system embeds a portion of the friction pin within the first substrate and the second substrate. In some configurations, the first speed and the second speed are substantially equivalent. In other configurations, the first speed is different from the second speed.

8 Claims, 2 Drawing Sheets

(56) References Cited

U.S. PATENT DOCUMENTS

| | | | |
|---|---|---|---|
| 9,056,370 B1 * | 6/2015 | Matlack | B23K 20/1215 |
| 9,764,375 B2 * | 9/2017 | Miles | B21J 15/10 |
| 9,808,855 B2 * | 11/2017 | Chung | B21J 15/02 |
| 2002/0027156 A1 * | 3/2002 | Coletta | B23K 20/129 |
| | | | 228/114.5 |
| 2002/0125297 A1 * | 9/2002 | Stol | B21J 15/027 |
| | | | 228/112.1 |
| 2003/0012619 A1 * | 1/2003 | O'Banion | B23K 20/12 |
| | | | 411/171 |
| 2003/0136810 A1 * | 7/2003 | Stevenson | B23K 20/127 |
| | | | 228/112.1 |
| 2003/0192940 A1 * | 10/2003 | Stevenson | B21J 15/027 |
| | | | 228/112.1 |
| 2003/0201306 A1 * | 10/2003 | McTernan | B23K 20/12 |
| | | | 228/112.1 |
| 2004/0118900 A1 * | 6/2004 | Stevenson | B21J 15/027 |
| | | | 228/114.5 |
| 2005/0178816 A1 * | 8/2005 | Stevenson | B21J 15/027 |
| | | | 228/112.1 |
| 2006/0169747 A1 * | 8/2006 | Tolle | B23K 20/1255 |
| | | | 228/112.1 |
| 2006/0175381 A1 * | 8/2006 | Wang | B21J 15/027 |
| | | | 228/112.1 |
| 2008/0006678 A1 * | 1/2008 | Packer | B23K 20/123 |
| | | | 228/114.5 |
| 2009/0206705 A1 * | 8/2009 | Nies | B23K 20/12 |
| | | | 310/361 |
| 2009/0236028 A1 * | 9/2009 | Fukuda | B21J 5/063 |
| | | | 156/73.5 |
| 2009/0291322 A1 * | 11/2009 | Watanabe | B23K 20/1265 |
| | | | 428/653 |
| 2010/0147925 A1 * | 6/2010 | Hanlon | B23K 20/1215 |
| | | | 228/112.1 |
| 2010/0186900 A1 * | 7/2010 | Christ | B23K 20/129 |
| | | | 156/510 |
| 2011/0062219 A1 * | 3/2011 | Bezaire | B23K 20/129 |
| | | | 228/114 |
| 2011/0073634 A1 * | 3/2011 | Packer | B23K 20/123 |
| | | | 228/2.3 |
| 2013/0228612 A1 * | 9/2013 | Higgins | B23K 20/1255 |
| | | | 228/102 |
| 2014/0123470 A1 * | 5/2014 | Miles | B21J 15/10 |
| | | | 29/525.06 |
| 2015/0144602 A1 * | 5/2015 | Draht | B23K 9/20 |
| | | | 219/91.23 |
| 2015/0328725 A1 * | 11/2015 | Wieland | B23K 35/0222 |
| | | | 428/600 |
| 2018/0036833 A1 * | 2/2018 | Mauer | B23K 20/1295 |
| 2018/0154426 A1 * | 6/2018 | Xiao | B23K 20/22 |

FOREIGN PATENT DOCUMENTS

| | | | | |
|---|---|---|---|---|
| JP | 10230372 A | * | 9/1998 | B23K 20/122 |
| JP | 10249552 A | * | 9/1998 | B23K 20/123 |
| JP | 2003071574 A | * | 3/2003 | |
| JP | 2004106046 A | * | 4/2004 | |
| JP | 2010046676 A | * | 3/2010 | |
| WO | WO-03097889 A1 | * | 11/2003 | B23K 20/1275 |
| WO | WO-2017110531 A1 | * | 6/2017 | B32B 7/12 |

* cited by examiner

METHOD AND APPARATUS FOR JOINING COMPONENTS WITH FRICTION PINS

INTRODUCTION

This disclosure generally relates to structures, apparatuses, and methods for joining components, for example metal, thermoplastics, or composites.

SUMMARY

A system, apparatus, or method for joining components is provided. The system applies force along an axis, with a friction pin, to a first substrate, such as with a joiner or joining apparatus. The system also frictionally melts a portion of the first substrate adjacent the friction pin by rotating the friction pin about the axis at a first speed within the first substrate.

The system also applies force to the second substrate along the axis and frictionally melts a portion of the second substrate adjacent the friction pin by rotating the friction pin at a second speed within the second substrate. The system embeds a portion of the friction pin within the first substrate and the second substrate.

In some configurations, the first speed and the second speed are substantially equivalent. In other configurations, the first speed is different from the second speed.

The system is configured to cut a remainder portion of the friction pin that is not embedded within the first substrate and the second substrate, such that some of the fiction pin remains within the substrates and some is separated therefrom.

In some configurations, the first substrate is formed from a first material, and the second substrate is formed from a second material, which is different from the first material. The materials may have different melting temperatures.

The friction pin may have a first portion with a first diameter and a second portion with a second diameter, with the second diameter being greater than the first diameter. Frictionally melting the portion of the first substrate adjacent the friction pin may occur by rotating the first portion of the friction pin within the first substrate at the first speed. Furthermore, frictionally melting the portion of the second substrate adjacent the friction pin may occur by rotating the first portion of the friction pin within the second substrate at the second speed, while the second portion of the friction pin is also rotating within the first substrate. Therefore, the first portion of the friction pin rotates at different speeds while within the first substrate and the second substrate.

The friction pin may have a first portion with a first surface treatment and a second portion with a second surface treatment, which is different than the first surface treatment. Furthermore, the system may be configured such that the first portion of the friction pin rotates at the first speed within the first substrate and rotates at the second speed within the second substrate, and the second speed may be greater than the first speed.

The above features and advantages, and other features and advantages, of the present subject matter are readily apparent from the following detailed description of some of the best modes and other configurations for carrying out the disclosed structures, methods, or both.

DETAILED DESCRIPTION

Figure 1A:
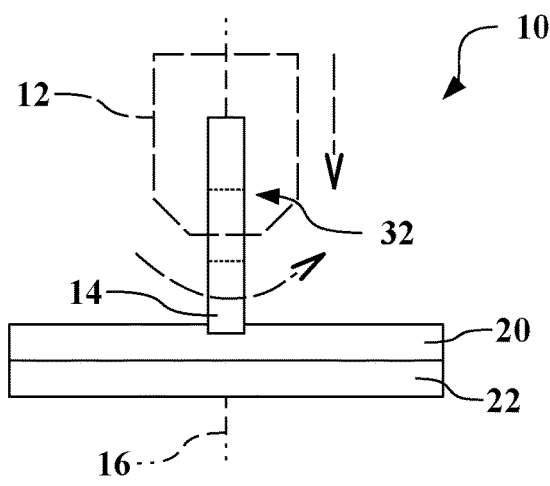
FIG. 1A is a schematic diagram of an apparatus or system for joining multiple components with a friction pin, showing a driver configured to rotate and advance the friction pin into the components.

In the drawings, like reference numbers correspond to like or similar components whenever possible throughout the several figures. There is shown in FIGS. 1A and 1B a schematic diagram of a system or apparatus 10, which illustrates a method of joining components.

A driver 12 (shown schematically in FIG. 1A) is configured to rotate and drive a friction pin 14 about, and along, an axis 16. The friction pin 14 joins a first substrate 20 to a second substrate 22, to form a combined part or component.

The driver 12 is configured to apply force along the axis 16, such that the friction pin 14 applies linear force to the first substrate 20. Additionally, the driver 12 is configured to rotate the friction pin 14 about the axis 16, such that the friction pin 14 is moving relative to the first substrate 20, and friction is generated therebetween.

Figure 1B:
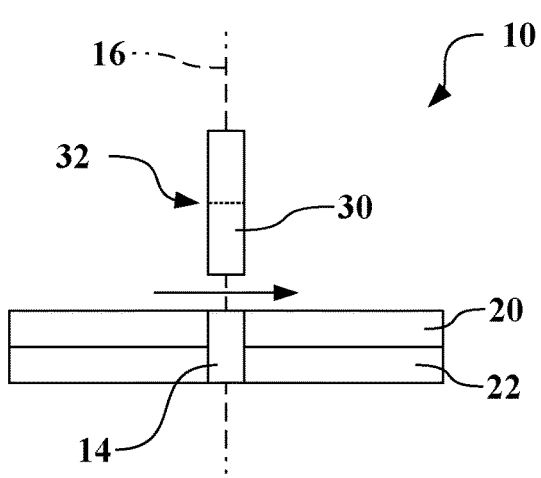
FIG. 1B is a schematic diagram of a portion of the apparatus or system of FIG. 1A, showing a portion of the friction pin embedded within the components and a remainder of the friction pin being cut.

As shown in FIG. 1A, the apparatus 10 frictionally melts a portion of the first substrate 20 adjacent the friction pin 14. The melting occurs as the driver 12 rotates the friction pin 14 about the axis 16 at a first speed both against the first substrate 20. The driver 12 is also applying force along the axis 16, such that the friction pin 14 applies force to the second substrate 22. As used herein, the terms "melt," "melting," and the like, refer to either complete melting of the referenced material to the point of liquidity or softening of the referenced material to the extent that objects, such as the friction pin 14, may move through without breaking or cutting adjacent portions of the referenced material. Melting may also refer to inducing sufficient plasticity in the material to allow the material to move and resolidify without introducing faults in the material.

Heat energy is generated by friction between the material of the friction pin 14 and the first substrate 20. The amount of heat energy depends on the force applied between the friction pin 14 and the first substrate 20, the relative movement caused by rotation of the friction pin 14, and the coefficient of friction between the friction pin 14 and the first substrate 20, as would be recognized by skilled artisans.

After advancing the friction pin 14 through the first substrate 20, the apparatus 10 frictionally melts a portion of the second substrate 22 adjacent the friction pin 14. The driver 12 rotates the friction pin 14 at a second speed within the second substrate 22. In some configurations, the first speed and the second speed are substantially the same, such that the friction pin 14 rotates at the same speed within both the first substrate 20 and the second substrate 22.

In the configuration shown in FIGS. 1A and 1B, the first substrate 20 and the second substrate 22 may be formed from materials have substantially similar melting temperatures and may have substantially similar coefficients of friction with the friction pin 14. The first substrate 20 and the second substrate 22 may be the same, or substantially similar, materials or may be different materials. Therefore, the interaction, and friction generated, between the friction pin 14 and the first substrate 20 is substantially similar to that between the friction pin 14 and the second substrate 22.

Once the friction pin 14 is within at least a portion of the second substrate 22, the driver 12 may stop rotating the friction pin 14, such that the first substrate 20 and the second substrate 22 cool and resolidify. At least a portion of the friction pin 14 then remains embedded within the first substrate 20 and the second substrate 22.

As shown in FIG. 1B, the apparatus 10 may cut a remainder portion 30 of the friction pin 14 that is not embedded within the first substrate 20 or the second substrate 22. In some configurations of the apparatus 10, the driver 12 may make the cut, or a separate shearing device or cutting apparatus may remove the remainder portion 30 from the embedded portion of the friction pin 14.

Furthermore, the friction pin 14 may be a pin stack 32 that includes a plurality of friction pins 14. Therefore, the remainder portion 30 includes additional friction pins 14 for use in subsequent joining processes. Therefore, the apparatus 10 iteratively drives and embeds the forward portion of the pin stack 32 into the first substrate 20 and the second substrate 22, and then cuts the remainder portion 30 from the embedded friction pin 14, allowing another set of the first substrate 20 and the second substrate 22 to be iteratively joined with the remainder portion 30 of the pin stack 32.

Note that the shapes of the first substrate 20 and the second substrate 22—and of all other components illustrated herein—are diagrammatically shown solely to illustrate general features of the apparatus 10. The shapes, sizes, or configurations shown are not limiting in any way.

The first substrate 20 and the second substrate 22 may be formed from, in very general terms, metals, plastics, or composites. Before joining, the first substrate 20 and the second substrate 22 may be, for example and without limitation, stamped, machined, compression molded, or injection molded to a final component shape.

The material of the first substrate 20 and the second substrate 22 will be capable of being melted and resolidified. For example, metals and thermoplastics (or composites formed therefrom) may be softened or melted repeatedly through heating, and then resolidified upon cooling.

All structures shown in the figures are basic illustrations to assist in description of the methods, apparatuses, and structures characterized herein. Skilled artisans will recognize that additional tools, components, and equipment may be used to implement the techniques described herein.

While the present disclosure may refer to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or of the description.

The term "substantially" refers to relationships that are, ideally perfect or complete, but where manufacturing realities prevent absolute perfection. Therefore, substantially denotes typical variance from perfection. For example, if height A is substantially equal to height B, it may be preferred that the two heights are 100.0% equivalent, but manufacturing realities likely result in the distances varying from such perfection. Skilled artisans would recognize the amount of acceptable variance within the relevant art.

Additionally, coverages, areas, or distances may generally be within 10% of perfection for substantial equivalence. Similarly, relative alignments, such as parallel or perpendicular, may generally be considered to be within 5%. Note, however, that those having ordinary skill in the relevant arts would understand acceptable variances from perfection.

Figure 2A:
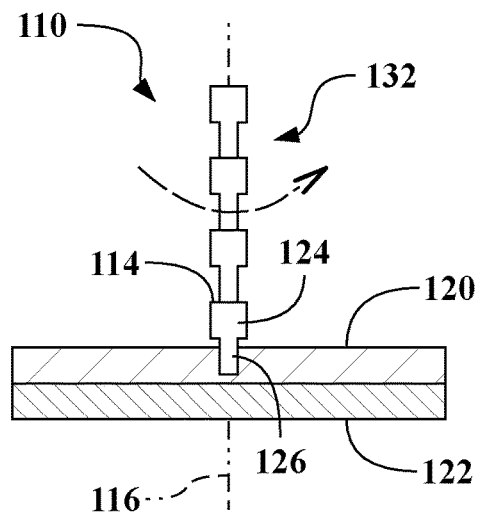
FIG. 2A is a schematic diagram of another apparatus or system for joining multiple components with a stepped-radius friction pin, showing a small diameter portion of the friction pin rotating within a first component at a first speed.
Figure 2B:
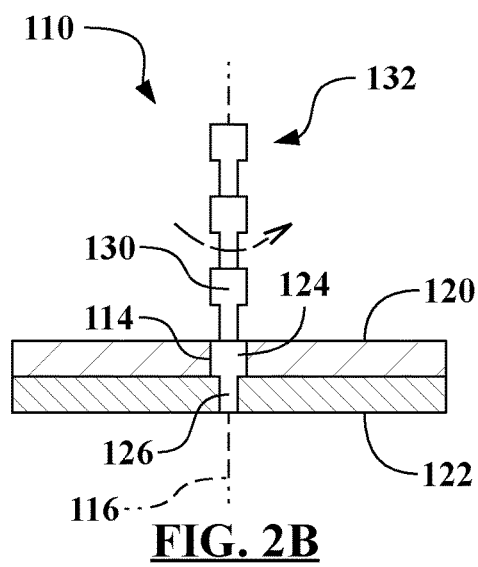
FIG. 2B is a schematic diagram of a portion of the apparatus or system of FIG. 2A, showing the small diameter portion of the friction pin rotating within a second component at a second speed, while a large diameter portion of the friction pin is rotating within the first component.

Referring also to FIG. 2A and FIG. 2B, and with continued reference to FIGS. 1A and 1B, there is shown a schematic diagram of another system or apparatus 110, which illustrates a method of joining components.

A driver (not shown FIGS. 2A and 2B) is configured to rotate and drive a friction pin 114 about, and along, an axis 116. The friction pin 114 joins a first substrate 120 to a second substrate 122, to form a combined part or component.

In the configuration shown in FIGS. 2A and 2B, the first substrate 120 is formed from a first material, and the second substrate 122 is formed from a second material, which is different from the first material. Therefore, the first substrate 120 and the second substrate 122 may have different melting temperatures. For example, the first material of the first substrate 120 may have a higher melting temperature than the second material of the second substrate 122.

As shown, the friction pin 114 has a stepped-radius configuration. The friction pin 114 has a first portion 124 with a first diameter and a second portion 126 with a second diameter that is greater than the first diameter. The first portion 124, with the smaller diameter, initially progresses into the first substrate 120 and then into the second substrate 122.

As shown in FIG. 2A, frictionally melting the portion of the first substrate 120 adjacent of the friction pin 114 occurs by rotating the first portion 124 of the friction pin 114 within the first substrate 120. The first portion 124 of the friction pin 114 rotates at a first speed within the first substrate 120.

Similarly, as shown in FIG. 2B, frictionally melting the portion of the second substrate 122 adjacent the friction pin 114 occurs by rotating the first portion of the friction pin 114 within the second substrate 122. The friction pin 114 rotates at a second speed within the second substrate 122.

The second speed of rotation of the friction pin 114 is less than the first speed. Note that the second portion of the friction pin 114 is also rotating within the first substrate 120, and also at the second speed.

The first substrate 120 has a higher melting temperature than the second substrate 122. While the smaller diameter first portion 124 of the friction pin 114 is within the first substrate 120, it is rotated at a high speed because the outer surface speed (tangential velocity) is less than the surface speed of the second portion 126.

However, as the first portion 124 is advanced into the second substrate 122, which has a lower melting temperature, rotation of the friction pin 114 is slowed to the second speed. The reduced tangential velocity of the first portion 124 is sufficient to melt portions of the second substrate 122 adjacent to the friction pin 114.

Concurrently, the larger diameter of the second portion 126 is creating higher tangential velocity at the interface of the second portion 125 and the first substrate 120. Therefore, the reduced rate of the second speed still introduces sufficient heat to keep portions of the first substrate 120 melted.

The apparatus 110 may cut a remainder portion 130 of the friction pin 114 that is not embedded within the first substrate 120 or the second substrate 122. The friction pin 114 shown is also configured as a pin stack 132 that includes a plurality of individual friction pins 114. The first portion 124 and the second portion 126 alternate within the pin stack 132. Therefore, after the remainder portion 130 is removed from the embedded portions of the friction pin 114, a subsequent first portion 124 is ready for use.

Melting, or at least softening, the material of the first substrate 120 and the second substrate 122 to embed the friction pin 114 may provide different attachment characteristics than, for example, driving a fastener through the first substrate 120 or the second substrate 122. Fasteners generally include threads, ridges, or other features that cut or pierce materials without melting. However, friction pin 114 penetrates the first substrate 120 or the second substrate 122 without cutting or damaging the materials being joined.

Figure 3A:
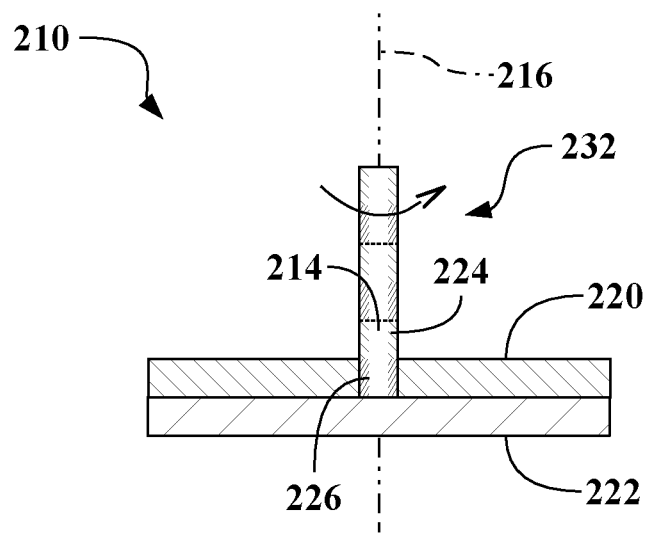
FIG. 3A is a schematic diagram of another apparatus or system for joining multiple components with a friction pin having different surface treatments along its substantially constant radius.
Figure 3B:
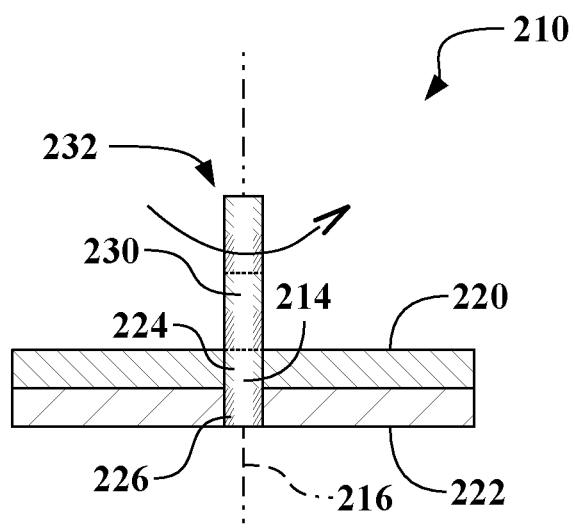
FIG. 3B is a schematic diagram of a portion of the apparatus or system of FIG. 3A, showing the friction pin entering a second component while rotating at a second speed.

Referring also to FIG. 3A and FIG. 3B, and with continued reference to FIGS. 1A-2B, there is shown an apparatus 210 for joining components with a friction pin 214 having different surface treatments. The friction pin 214 is rotated about, and advanced along, an axis 216, such as with a joiner (not shown), into a first substrate 220 and a second substrate 222.

The friction pin 214 has a substantially constant diameter, but has different surface treatments on a first portion 124 and a second portion 126. The varied surface treatments may be achieved via, for example and without limitation: chemical, physical, or material processing. The different surface treatments of the first portion 124 and the second portion 126 affect the coefficient of friction experienced between the first portion 124 and first substrate 220 and the second substrate 222, and also between the second portion 126 and the first substrate 220.

In the configuration of FIGS. 3A and 3B, the first substrate 220 and the second substrate 222 may have different melting temperatures. In particular, and unlike the configuration shown in FIGS. 2A and 2B, the material of the second substrate 222 may have a higher melting temperature than the material of the first substrate 220. The friction pin 214 is initially rotated at a first speed while in the first substrate 220 and then at a second speed while the first portion 224 of the friction pin 214 is within the second substrate 222.

The first speed of rotation may be lower, due to the lower melting temperature of the first substrate, such that less frictional heat energy is required while the first portion 224 is rotating to melt the first substrate 220 relative to the energy needed to melt the second substrate 222. Therefore, as the first portion 224 is advanced into the second substrate 222, the rotational speed is increased to the second speed, so that the first portion 224 generates additional friction heat to melt the second substrate 222, in spite of its higher melting temperature.

While the friction pin 214 is rotating at the second speed so that the first portion 224 melts adjacent portions of the second substrate 222, the second portion 226 is melting portions of the first substrate 220. The surface treatment of the second portion may reduce the friction coefficient between the second portion 226 and the first substrate 220 may be reduced relative to the friction coefficient between the first portion 224 and the first substrate 220.

Therefore, there is less frictional heat produced between the second portion 226 and the first substrate 220 while the friction pin 214 is rotating at the second speed. The frictional heat produced at the second speed is sufficient to melt the second substrate 222 with the first portion 224 of the friction pin 214 and is sufficient to melt, or to maintain the already-melted state of, the first substrate 220 with the second portion 226 of the friction pin 214.

The detailed description and the drawings or figures are supportive and descriptive of the subject matter discussed herein. While some of the best modes and other embodiments have been described in detail, various alternative designs, embodiments, and configurations exist.

The invention claimed is:

1. A method of joining components, comprising:
applying force along an axis, via a friction pin, to a first substrate, wherein the friction pin has a first portion with a constant first diameter and a second portion with a constant second diameter, and the second diameter is greater than the first diameter, such that there is a step between the first portion and the second portion of the friction pin;
frictionally melting a portion of the first substrate adjacent the first portion of the friction pin by rotating the friction pin about the axis at a first speed within the first substrate;
applying force along the axis, via the friction pin, to a second substrate;
frictionally melting a portion of the second substrate adjacent the first portion of the friction pin by rotating the friction pin at a second speed within the second substrate while the second portion of the friction pin is melting a portion the first substrate, wherein the second speed is different from the first speed; and
embedding a portion of the friction pin within the first substrate and the second substrate, such that the first substrate and the second substrate are joined with the friction pin,
wherein the first substrate is formed from a first material and the second substrate is formed from a second material, different from the first material, and the first material has a higher melting temperature than the second material.

2. The method of claim 1, wherein the friction pin is a first friction pin and is directly attached to a substantially identical second friction pin, and further comprising:
cutting the second friction pin that is not embedded within the first substrate and the second substrate, such that the first friction pin remains within the first substrate and the second substrate and the second friction pin is separated from the first friction pin.

3. The method of claim 1, wherein the second speed is less than the first speed.

4. The method of claim 1, wherein the first portion of the friction pin has a first surface treatment and the second portion has a second surface treatment, different than the first surface treatment, such that the first portion and the second portion have different coefficients of friction.

5. The method of claim 4, wherein the second speed is greater than the first speed.

6. The method of claim 2, wherein the first portion of the friction pin has a first surface treatment and the second portion has a second surface treatment, different than the first surface treatment, such that the first portion and the second portion have different coefficients of friction.

7. The method of claim 3, wherein the friction pin is a first friction pin and is directly attached to a substantially identical second friction pin, and further comprising:
  cutting the second friction pin that is not embedded within the first substrate and the second substrate, such that the first friction pin remains within the first substrate and the second substrate and the second friction pin is separated from the first friction pin.

8. The method of claim 3, wherein the first portion of the friction pin has a first surface treatment and the second portion has a second surface treatment, different than the first surface treatment, such that the first portion and the second portion have different coefficients of friction.

* * * * *